June 20, 1933.  C. B. HALL  1,914,854
CINEMATOGRAPHIC APPARATUS
Filed June 26, 1931   3 Sheets-Sheet 3
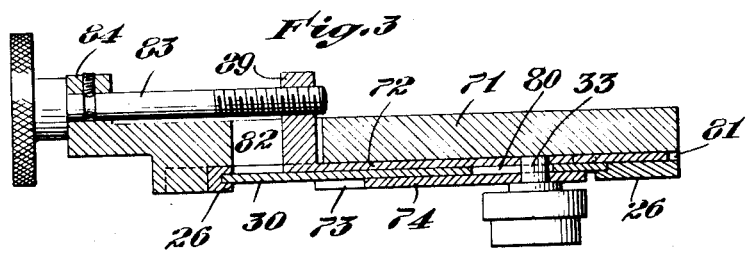
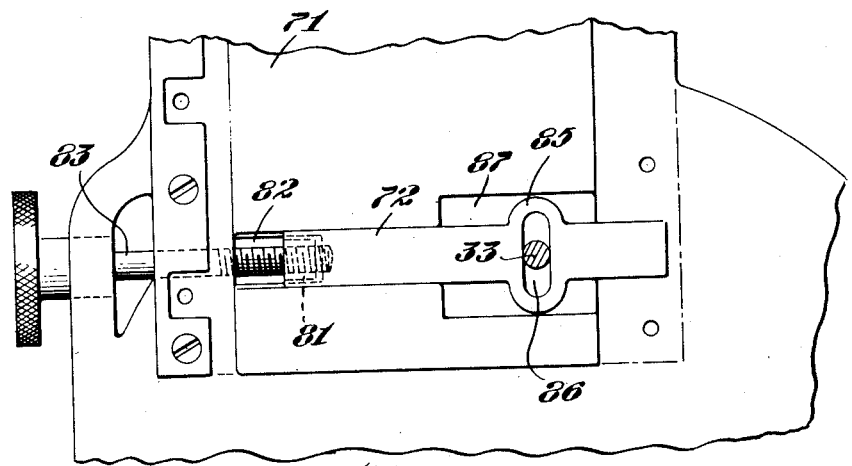
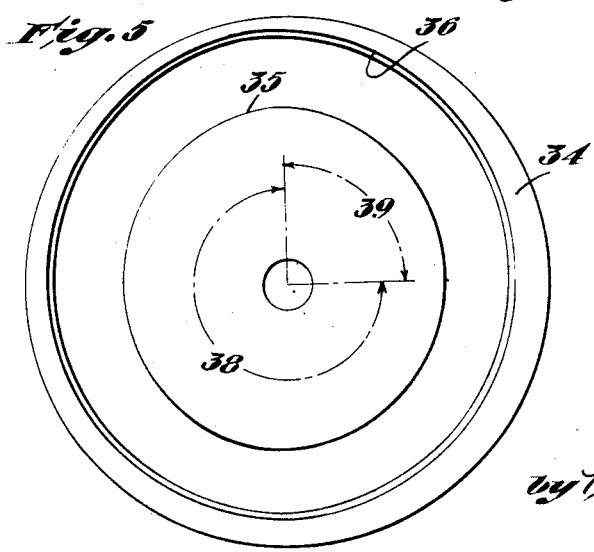
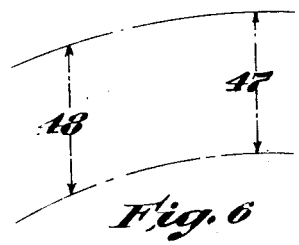
Inventor
Clarence B. Hall
by Roberts, Cushman & Woodberry
Attys.

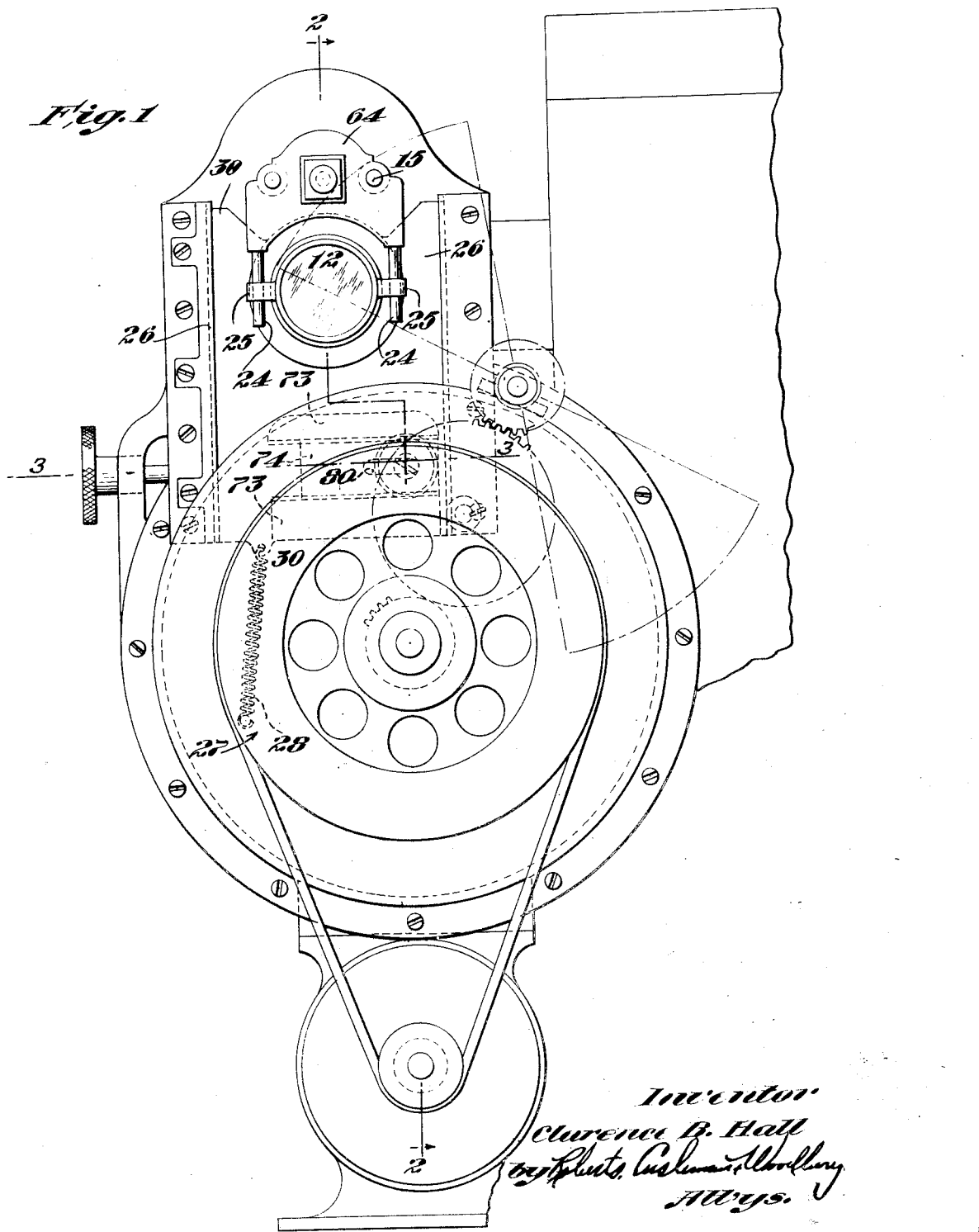

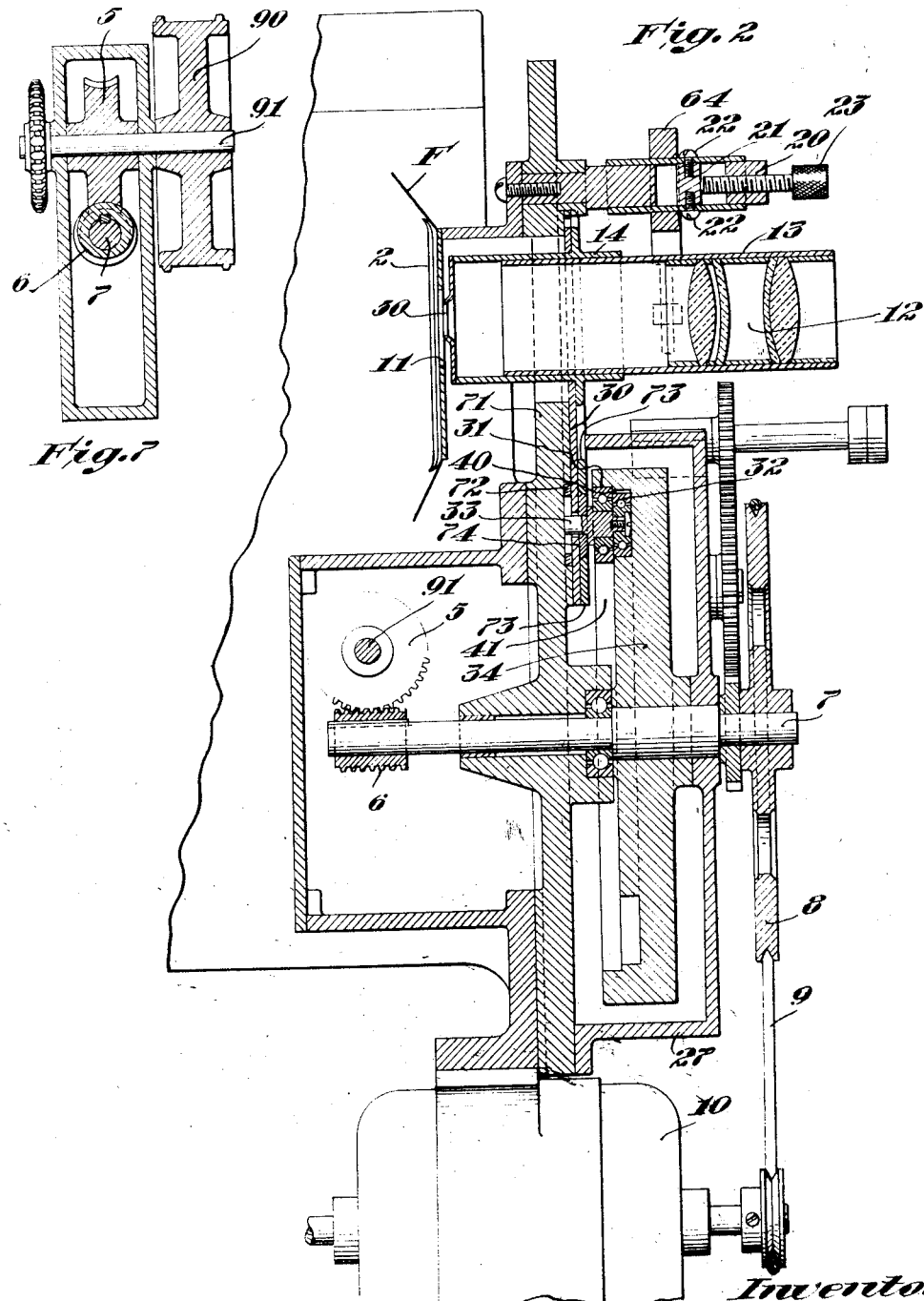

Patented June 20, 1933

1,914,854

UNITED STATES PATENT OFFICE

CLARENCE B. HALL, OF BOSTON, MASSACHUSETTS, ASSIGNOR TO LORENZ F. MUTHER, OF NEWTON, MASSACHUSETTS

CINEMATOGRAPHIC APPARATUS

Application filed June 26, 1931. Serial No. 547,029.

The present invention is an improvement on cinematographic apparatus, such as described and claimed in my Letters Patent No. 1,798,793 of March 31, 1931, involving among other novel arrangements a device for adjusting the throw of a cam which actuates a reciprocating lens system. This adjusting device has certain disadvantages because its operation disturbs the correct relation between film pictures and aperture, since any movement of the worm which connects the cam drive and film sprocket drive also moves the driven gear of the film sprocket. It is therefore the main object of the present invention to provide a device for adjusting the throw of the reciprocating parts described in my above identified patent without moving the picture out of frame. Another object is the reduction of the necessary number of gears and generally to provide a more simple and quiet device of the character described.

According to the present invention, the cam and the sprocket driven gear remain stationary in their relative positions so that the spatial relation of film picture and aperture remains undisturbed. This is obtained by making the lens shifting follower adjustable, which causes merely a very slight shifting, during adjustment, of the reciprocating lens system which is, however, not of sufficient magnitude to require reframing except in case of radical adjustment. This new arrangement with a stationary cam moreover permits the elimination of certain gears between cam and film feeding sprocket with the consequent improvement of operating conditions.

For the purpose of illustration a concrete embodiment of the invention is shown in the accompanying drawings, in which:

Fig. 1 is a front elevation;
Fig. 2 is a vertical section on line 2—2 of Fig. 1;
Fig. 3 is a transverse section on line 3—3 of Fig. 1;
Fig. 4 is an enlarged front view with certain parts removed;
Fig. 5 is a face view of the lens actuating cam;

Fig. 6 is a diagram showing the variations of the throw of the reciprocating lens with the adjustment of the follower rolls transversely of the vertical axis; and Fig. 7 is a top view of the sprocket wheel drive.

In the illustrated embodiment of the invention the film F is fed at uniform speed through film gate 2 over rolls and a driven sprocket wheel the rolls being not shown as not essential for a full understanding of the present invention. The film feeding sprocket is continuously driven from motor 10 over belt 9, pulley 8, shaft 7, worm 6 and worm gear 5. In the case of a projector the light from a suitable source is projected through the film as it passes the aperture 11 in the film gate and thence through the lenses 12 to the projection screen. Lenses 12 are mounted in a cylinder 13 which slides along the optical axis in an outer cylinder 14. The mechanism for adjusting the cylinder 13, comprising a yoke 64 having depending rods or pins 24 sliding in lugs 25 fast to the cylinder 13 and sliding horizontally on pins 15, screw adjuster 23, block 21, and screws 22, are described in the above identified patent and need not be described in detail herein.

The outer lens cylinder 14 is mounted on a plate 30 for vertical reciprocation in the guides 26, and a spring 28 (Fig. 1) fastened to plate 30 and to the cam casing 27 cooperates in the action of the lens reciprocating movement. The plate 30 carries on its lower end two cam followers 31 and 32, each comprising inner rings fast to the pin 33 and outer rings rolling on the inner rings through ball bearings. The cam for vertically reciprocating the lens through the medium of the aforesaid cam followers is shown at 34 and is fast on the shaft 7. As shown in Fig. 5, this cam has inner and outer cam surfaces 35 and 36 engaging the followers 31 and 32 respectively, the surfaces being shaped to move the lens downwardly at approximately the speed of the film, throughout the 270° arc indicated at 38 in Fig. 5, and then quickly to return the lens to uppermost position throughout the remaining 90° indicated at 39 in Fig. 5. The design and operation of the cam movement is fully described in Patent No. 1,798,793.

With the parts in the position shown in Figs. 1, 2 and 3 the axis of the cam is in the vertical plane of the cam followers and the vertical throw of the reciprocatory lens is a minimum. As the cam is moved off center the throw is increased as indicated in Fig. 6 where 47 indicates the throw in dead-center position and 48 the throw off dead-center position. Obviously the more the cam is moved from dead-center position the greater the throw and the speed of reciprocation.

Referring to Figs. 3 and 4, the adjusting device according to the present invention will now be described. The plate 30 which supports cylinder 14 and lens tube 13 has two guides 73 fastened to it, these guides forming a dovetail in which a plate 74 with chamfered edges is slidably inserted. Rigidly fastened to plate 74 is a pin 33 bearing on the outside the followers 31 and 32 and protruding on the other side through a longitudinal opening or slot 80 of plate 30 which permits lateral movement of plate 74 and pin relative to plate 30. The main casting 71 has a recess 81 which contains a slide 72 with a threaded lug 89 projecting through a slot 82 of casting 71. An adjusting screw 83 journaled in boss 84 of the casting engages lug 81 and with its aid slide 72 can be moved laterally. This slide 72 has a cross extension 85 with a slot 86 which permits relative vertical movement of the portion of pin 33 which protrudes through slot 80 of plate 30. For the cross extension 85 space for lateral movement is provided in the wider part 87 of the recess 81, and slide 72 is maintained in proper position within the recess by the plate 30 which can only move vertically in its guides 26 whereas plate 74 can only move laterally relatively to plate 30 in its guides 73.

For the same purpose as explained in my Patent 1,798,793, the adjustment of the cam movement is operated in the following manner. By adjusting screw 83, slide 72 can be moved laterally in either direction, whereby the vertical movement of pin 33 in slot 86 is not hindered. However, the pin with its rollers is thereby moved laterally, being engaged by the vertical sides of slot 86, supported on the outside by the laterally movable plate 74 and permitted to be moved in lateral direction by the horizontal slot 80 of the vertically reciprocating plate 30 which transmits the reciprocating motion from the cam over the followers, pin 33, slot 80, and plate 30 to the lens system, thereby avoiding any relative movement between lens drive and film drive. It will further be readily seen that the new arrangement avoids any relative movement between cam drive and film drive. Therefore, as shown in Fig. 7, the worm gear 5 can be made very short and therefore of larger diameter, so that the film driving sprocket 90 can be put directly on the shaft 91 of gear 5. This construction eliminates at least two gears, thereby improving the steadiness of the drive and consequently that of the picture upon the screen.

It should be understood that the present disclosure is for the purpose of illustration only and that this invention includes all modifications and equivalents which fall within the scope of the appended claims.

I claim:

1. Cinematographic apparatus comprising means for feeding a film continuously across an optical axis, a lens reciprocating back and forth along a path extending transversely of said axis, a cam follower connected to said lens, a rotating cam engaging said follower for reciprocating the lens, and adjusting means for moving the follower transversely of said path to vary the throw of the lens.

2. Cinematographic apparatus comprising means for feeding a film continuously along a predetermined path, a lens reciprocating along a line parallel to said path, a cam follower connected with the lens, a cam engaging the follower and rotating about an axis disposed in a plane perpendicular to said line, and means for adjusting said follower transversely of said axis substantially perpendicular to said line, from a position wherein said axis intersects said line to an off-center position.

3. Cinematographic apparatus comprising means for feeding a film continuously along a predetermined path, a lens fast to a plate reciprocating parallel to said path, a cam follower, a rotating cam engaging said follower, means mounted on said plate transversely slidable relative to the plate and supporting said follower, and adjusting means engaging said follower for moving it transversely of said path, said follower being so supported in said slidable means that it is free to move transversely of said plate, and said follower being so engaged by said adjusting means that it is free to move in the direction of said path.

4. Cinematographic apparatus comprising a sprocket wheel for feeding a film continuously across an optical axis, a lens reciprocating back and forth along a path extending transversely of said axis, a cam follower connected to said lens, a cam fixed to a driving shaft and engaging said follower for reciprocating the lens, and means for adjusting said follower transversely of said path, said sprocket wheel being directly geared to said shaft.

Signed by me at Boston, Massachusetts this 16th day of June, 1931.

CLARENCE B. HALL.